Oct. 18, 1955  B. F. ARPS  2,720,717
CUTTER HEAD FOR TRENCH DIGGER CHAIN
Filed Aug. 30, 1950  2 Sheets-Sheet 1
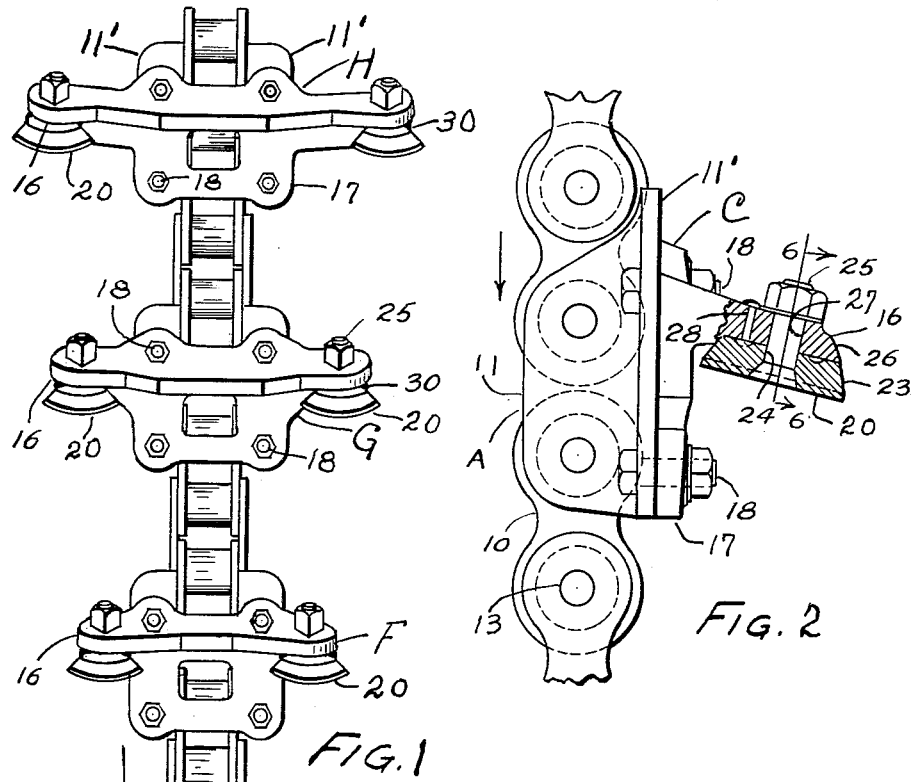
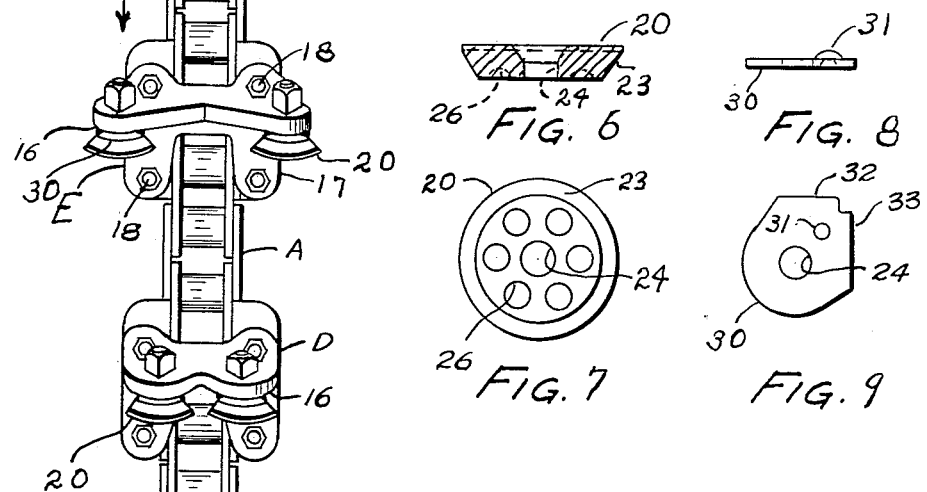
INVENTOR.
BRUNO F. ARPS
BY
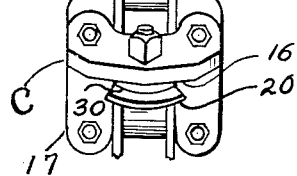
ATTORNEY Oct. 18, 1955  B. F. ARPS  2,720,717
CUTTER HEAD FOR TRENCH DIGGER CHAIN
Filed Aug. 30, 1950  2 Sheets-Sheet 2

INVENTOR.
BRUNO F. ARPS
BY *A.S.Kroll*
ATTORNEY

2,720,717
CUTTER HEAD FOR TRENCH DIGGER CHAIN

Bruno F. Arps, New Holstein, Wis.

Application August 30, 1950, Serial No. 182,264

2 Claims. (Cl. 37—191)

The present invention relates to a trench digger chain assembly having a number of spaced apart cutter brackets secured to certain links, each bracket having mounted thereon novel cutter discs in a manner whereby maximum work speed may be obtained in all conditions of soil at a minimum expenditure for power and upkeep.

An object of the present invention is to preferably provide groups of brackets, the leading bracket of each group having preferably a single cutter disc, and the other cutter brackets in the group having preferably two similar discs, which are preferably progressively positioned outwardly on the ends of cutter brackets, whereby each disc will engage and loosen a small and predetermined amount of material from a projection left by the preceding disc so the work for each head and disc is limited, thus to successfully operate in very hard stony or frozen ground.

Another novel feature of my invention is the size and shape of the cutter discs and the means provided for turning the discs to present for work a fresh and sharp surface.

In my design, the groups of disc brackets are preferably arranged, whereby the widest apart discs are in rear of the group so as to determine the width of the trench dug, generally if it is desired to cut for example, a ten inch wide trench, I preferably provide six cutter brackets in groups, the leading bracket of each group having preferably one disc and the other five brackets each having two discs at their ends, the one disc bracket leading and the following discs in the group being progressively spaced further apart, so each disc will be required to cut about one inch in width, the depth of cut being determined by the speed of the tractor.

For example, in my preferred design as the tractor travels forward each group of brackets may be caused to extend the trench one inch and in the operation at this speed each disc will be required to cut free substantially a square inch of material from the bottom to the top of the trench.

It will be seen from the foregoing that my device in its preferred design operates progressively, and in a scientific manner, so the device will operate with the load divided equally between the cutting discs, the speed of the tractor being determined by the condition of the soil, therefore the limiting factor of speed is a matter of soil condition and easily determined by the operator.

Clearly in some soils the tractor may be caused to travel forward at a reasonably rapid speed and in other soil conditions wherein the ground is very hard, frozen and full of stones the tractor speed is reduced accordingly.

When my device is attached to a conventional farm tractor, experience has developed the fact that a six or eight inch wide trench, three to five feet deep may generally be dug at the rate of four or five hundred feet per hour, and a twenty inch width, four or five feet deep, may generally be dug at the rate of sixty feet per hour.

In the foregoing I have outlined by preferred designs, I wish it understood that the discs may be differently positioned on the brackets; that each bracket may have two or more discs; and that the disc need not necessarily by arranged in groups. The principal feature of the present invention is my novel disc cutter blades and manner of securing them to their seats.

To these and other useful ends my invention consists of parts, combinations of parts or their equivalents and mode of operation as hereinafter described and claimed and shown in the accompanying drawings in which:

Fig. 1 is a fractional length of an endless digger chain A having six cutter brackets secured thereto forming a section of brackets arranged to dig a trench ten inches wide.

Fig. 2 is a side elevational view of a fraction of the chain as shown in Fig. 1 with a single cutter disc attached thereto. The disc and its bracket seat being sectioned on line 2—2 of Figure 1.

Fig. 6 is a sectional view of a cutter disc taken on line 6—6 of Fig. 2.

Fig. 7 is a bottom view of the cutter disc shown in Fig. 6.

Figs. 8 and 9 illustrate modifications.

Figure 3:
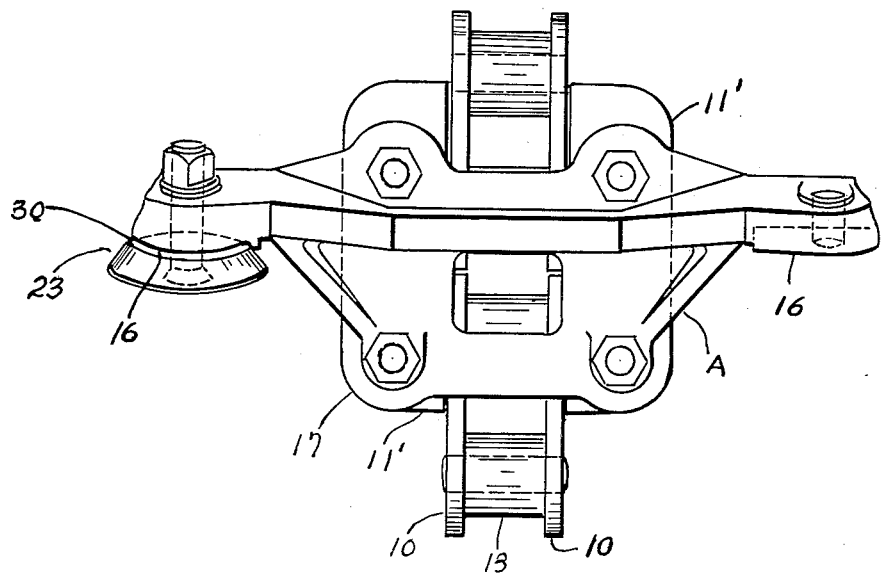
Fig. 3 is an enlarged front view of a two disc cutter bracket shown as attached to a short section of chain.

As thus illustrated the endless chain in its entirety is designated by reference character A, the tractor in its entirety is designated by reference character B, the cutter brackets in their entireties as shown in Figure 1 are designated by reference characters C, D, E, F, G and H.

Chain A comprises inner links 10—10, and outside links 11—11. These links are hingedly held together by means of pins 12, each pin having preferably rotatably mounted thereon a roller 13 thus forming a conventional roller chain.

In Figure 1, I illlustrate a fraction of chain A having mounted thereon six cutter brackets, thus forming what I term a group and adapted to dig a ten inch wide trench. To dig a twelve inch trench, seven cutter brackets are necessary for each group and for digging a fourteen inch trench, eight cutter brackets are necessary; thus the number of brackets per group is optional. The space between end brackets of the groups is optional and the space between end brackets of the group is preferably the same as the space between the brackets in the groups, and this spacing being preferably on every other link of the chain.

The front or leading bracket C of each group has a single cutter disc 20, and the other brackets are each substantially two inches wider than the preceding bracket and having two cutter discs 20 on the transverse ends thereof as illustrated in Figure 1. The cutter discs of each group of brackets are preferably in V-shaped formation and travel in the direction indicated by arrows. An arrow also indicates the direction of travel of tractor B, and chain A which is endless travels in the direction indicated by arrow in this figure.

Figure 5:
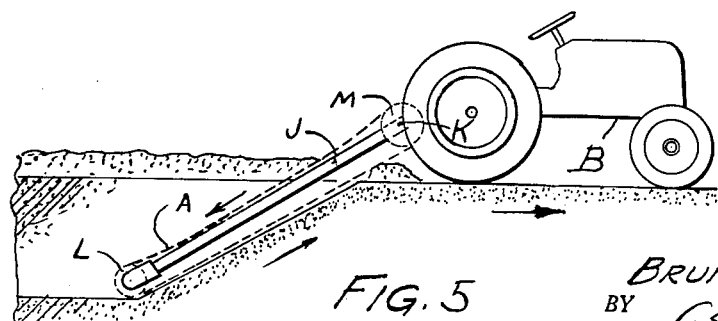
Fig. 5 is a diagrammatic side elevational view of a farm tractor illustrating my trench digger device attached thereto and in operating position.

It will be seen by scrutinizing Figure 5 that my attachment as mounted on the tractor, comprises a boom or frame J. The boom on its upper end is preferably transversely pivoted to the tractor as at K and having rotatably mounted thereon lower and upper sprockets L and M. Sprocket M is preferably mounted on a driving shaft whose center is at K, this shaft having an operating connection preferably from the power takeoff of the tractor (not shown). I also provide means (not shown) for greatly reducing the forward traveling speed of the tractor for a purpose which will be obvious in view of the preceding recitations.

Figure 4:
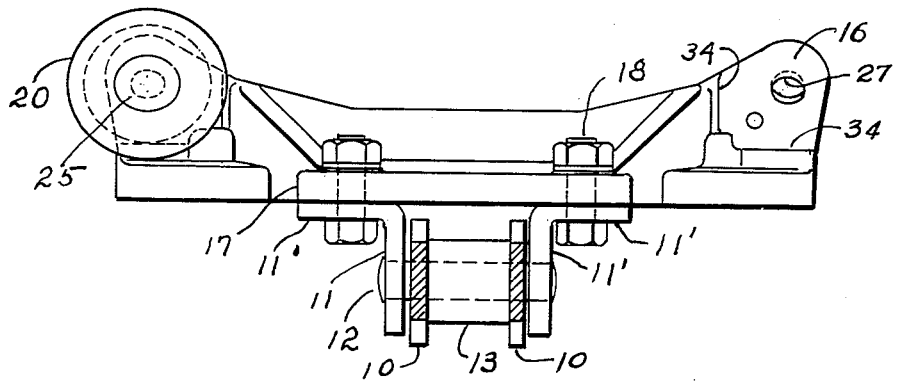
Fig. 4 is an enlarged end view of the bracket and chain as shown in Fig. 3.

Each bracket of a group is provided with one or two cutter disc seats 16 and a base member 17. Each outside link 11 is provided with L-shaped extensions 11' (see Fig. 4) to which members 17 of the brackets are attached by means of preferably four bolts 18. I provide preferably one centrally positioned disc seat 16 on bracket C, each of the other brackets of the group of brackets have two disc seats on their transverse ends.

Each group of brackets has preferably a leading bracket C with one cutter blade, and all of the other brackets of any desired number of brackets have preferably two cutter blades arranged preferably in the order shown in Figure 1.

I will now describe the preferred design of my novel cutter discs designated by reference numeral 20. Cutter bracket C is provided with a single cutter seat 16, all of the other brackets have as shown two seats as illustrated. Blades 20 are preferably made from mild steel and case hardened, having a diameter preferably of two and three eights inches, and a shape as clearly illustrated in Figures 6 and 7, the leading or cutting face being preferably flat and the blades having a thickness of preferably one half inch, the outer edge being tapered for clearance purposes, as at 23.

Blades 20 have a countersunk opening 24 for the reception of what is commonly called a plow bolt 25 for holding the cutter blades on member 16. Each blade is provided with a number of concentrically positioned depressions 26. Members 16 have openings 27 for the reception of bolts 25. Each seat may be provided with a rivet 28, the head of which is adapted to fit into depressions 26 in member 20 (see Fig. 7). Thus it will be seen that each depression may act to determine the working position of disc 20, so that as the discs wear they may be turned for presenting a new cutting surface, the rivet head acting to cooperate with the bolt 25 to firmly lock the disc into its adjusted position.

Under some circumstances it may not be advisable to drill holes in members 16 for the reception of rivets 28. I provide means whereby this is not necessary by supplying washers 30 and position them between the cutter blades and their seats 16 as illustrated in Figures 1 and 3.

These washers, as illustrated in Figures 8 and 9, have projections 31 formed therein adapted to fit into depressions 26, and are shaped so they will not turn on seat 16. Washers 30 are provided with openings 24' for the reception of bolts 25. The brackets are provided with an offset or offsets 34 which are adapted to contact surfaces 32 and 33 on members 30. Thus washers 30 will answer the purpose of rivets 23, because they can not turn out of position and because of projections 31 acting to lock the disc blade to the locked washer and bracket.

Special attention is called to the fact that discs 30 are relatively small, light and can be manufactured of mild steel and case hardened at very low cost or they may obviously be made from other kinds of steel of suitable hardness. Thus the costs of the discs compared to their life is very minor. Regardless of the extreme service that may be required of them therefore, clearly the upkeep will be very low compared to the work done by the digger.

Clearly discs 20 are so inexpensive that they may be thrown away when worn dull around their entire periphery after having been turned to their six positions.

I have shown and described the preferred embodiment of my invention. I wish it understood that I do not wish to be limited to the specific design shown.

Clearly many minor detail changes in the design as shown may be made without departing from the spirit and scope of my invention as recited in the appended claims.

I claim:

1. A trench digging device of the character described comprising in combination, an endless trench digger chain having mounted thereon a number of spaced brackets, each bracket being secured to adjacent side links of the chain, certain brackets having secured thereto relatively narrow cutter blades which are arranged in groups, each group comprising a leading single narrow cutter blade and positioned on the longitudinal axis of the chain, one or more other brackets in each said group, each having mounted thereon two transversely spaced narrow cutter blades, the blades being arranged in V formation relative to the leading blade, each pair of blades being arranged to widen the trench formed by the preceding blade or blades, whereby each group of blades will cut loose a slice of earth from the front end of the trench being formed, said blades comprising circular discs being secured to their brackets by means of a single concentrically positioned bolt, a number of spaced concentrically arranged depressions on the rear side of said circular discs, projections on said brackets adapted to engage said depressions for holding the cutter blades in their adjusted position.

2. A trench digging device of the character described comprising in combination, an endless trench digger chain having mounted thereon a number of spaced brackets, each bracket being secured to adjacent side links of the chain, certain brackets having secured thereto relatively thin and small in diameter disc cutter blades which are arranged in groups, each group comprising a leading single disc cutter blade and positioned on the longitudinal axis of the chain, one or more other brackets in each said group of disc cutter blades, each having mounted thereon two transversely spaced disc cutter blades, the blades being arranged in V formation relative to said front blade, each said pair of blades being arranged to widen the trench formed by the preceding blade or blades whereby each group of blades will cut loose a slice of earth from the front of the trench being formed, said disc blades being secured to their brackets by means of a single concentrically positioned bolt, a number of spaced concentrically arranged depressions on the rear side of said circular discs, projections on said brackets adapted to engage one of said depressions for holding the disc cutter blades in their adjusted positions.

References Cited in the file of this patent

UNITED STATES PATENTS

| Number | Name | Date |
|---|---|---|
| 482,033 | Atkinson et al. | Sept. 6, 1892 |
| 915,963 | Hovland | Mar. 23, 1909 |
| 1,244,785 | Sessions | Oct. 30, 1917 |
| 1,404,835 | Christine | Jan. 31, 1922 |
| 1,528,546 | Holmes | Mar. 3, 1925 |
| 2,036,327 | Fulke | Apr. 17, 1936 |
| 2,274,970 | Tiffany | Mar. 3, 1942 |
| 2,519,076 | Schmidt | Aug. 15, 1950 |

FOREIGN PATENTS

| Number | Country | Date |
|---|---|---|
| 1,890 | Great Britain | of 1875 |
| 16,476 | Great Britain | of 1891 |